US007724333B2

(12) United States Patent
Sohn et al.

(10) Patent No.: US 7,724,333 B2
(45) Date of Patent: May 25, 2010

(54) LIQUID CRYSTAL DISPLAY AND METHOD OF FABRICATING THE SAME

(75) Inventors: Ji-won Sohn, Seoul (KR); Jong-ho Son, Seoul (KR); Seung-beom Park, Seoul (KR); Seon-ah Cho, Busan (KR); Jun-hee Na, Asan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 162 days.

(21) Appl. No.: 11/931,249

(22) Filed: Oct. 31, 2007

(65) Prior Publication Data
US 2008/0266513 A1 Oct. 30, 2008

(30) Foreign Application Priority Data
Apr. 25, 2007 (KR) .................. 10-2007-0040450

(51) Int. Cl.
G02F 1/1333 (2006.01)
(52) U.S. Cl. .................. 349/129; 349/182
(58) Field of Classification Search .................. None
See application file for complete search history.

(56) References Cited

U.S. PATENT DOCUMENTS

| 5,818,550 | A * | 10/1998 | Kadota et al. .................. 349/43 |
| 6,151,003 | A * | 11/2000 | Tsuda et al. .................. 345/87 |
| 6,384,889 | B1 * | 5/2002 | Miyachi et al. .............. 349/143 |
| 6,952,252 | B2 * | 10/2005 | Nakanishi .................... 349/182 |
| 2003/0151703 | A1 * | 8/2003 | Nakanishi et al. ............. 349/86 |
| 2004/0004690 | A1 * | 1/2004 | Yamaguchi et al. ......... 349/141 |
| 2004/0070715 | A1 * | 4/2004 | Ma et al. .................... 349/130 |

FOREIGN PATENT DOCUMENTS

| JP | 11-343486 | 12/1999 |
| JP | 2001-072976 | 3/2001 |
| JP | 2006-099039 | 4/2006 |

OTHER PUBLICATIONS

English Abstract for Japanese Patent Publication No. 2001-072976, published on Mar. 21, 2001, Patent Abstracts of Japan, 2 pages.
English Abstract for Japanese Patent Publication No. 2006-099039, published on Apr. 13, 2006, Patent Abstracts of Japan, 2 pages.
English Abstract for Japanese Patent Publication No. 11-343486, published on Dec. 14, 1999, Patent Abstracts of Japan, 2 pages.

* cited by examiner

*Primary Examiner*—Mike Stahl
(74) *Attorney, Agent, or Firm*—Innovation Counsel LLP

(57) ABSTRACT

A liquid crystal display (LCD) comprises a first substrate comprising a pixel electrode comprising one or more first domain-forming features and further comprising a first vertical alignment film disposed on the pixel electrode; a second substrate facing the first substrate and comprising a common electrode which comprises one or more second domain-forming features and further comprises a second vertical alignment film disposed on the common electrode; and a liquid crystal compound interposed between the first and second substrates, wherein the liquid crystal compound comprises liquid crystal molecules, ultraviolet (UV) hardening monomers and UV hardening initiators, and the liquid crystal molecules are pre-tilted to form an angle greater than 88 degrees but less than 90 degrees with respect to the first substrate when no driving power is applied to the pixel and common electrodes. Fast response time is provided in some embodiments.

22 Claims, 13 Drawing Sheets

FIG. 12
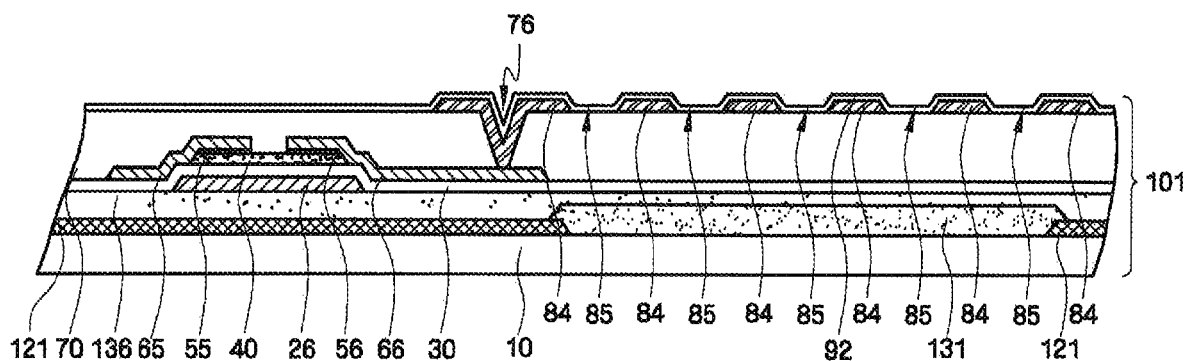
FIG. 13
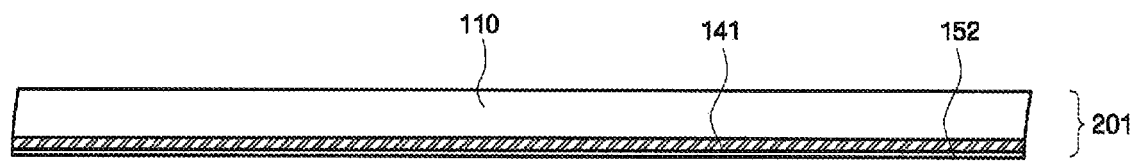
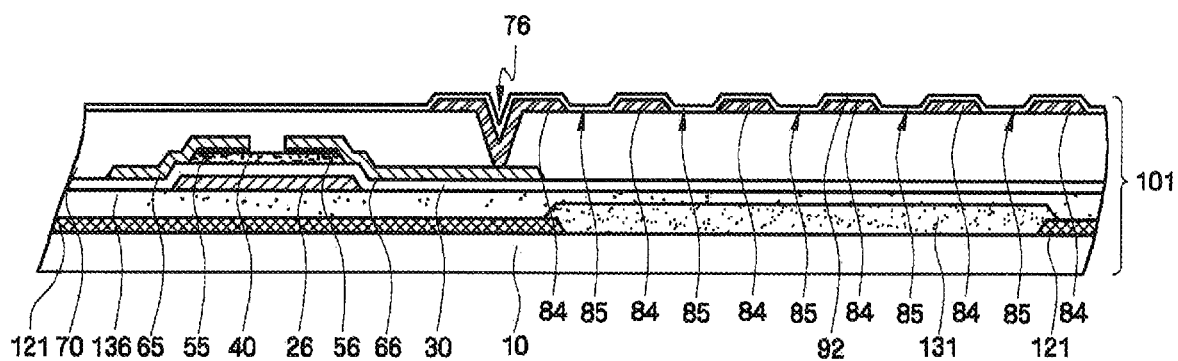

LIQUID CRYSTAL DISPLAY AND METHOD OF FABRICATING THE SAME

CROSS-REFERENCE TO RELATED APPLICATION

This application claims priority from South Korean Patent Application No. 10-2007-0040450 filed on Apr. 25, 2007, the disclosure of which is incorporated herein by reference in its entirety.

BACKGROUND OF THE INVENTION

1. Field of the Invention

The present invention relates to a liquid crystal display (LCD) and a method of fabricating the same. Some embodiments provide an LCD with an improved response time.

2. Description of the Related Art

Liquid crystal displays (LCDs) are widely used flat panel displays. Generally, an LCD includes a pair of substrates having electric-field-generating electrodes, such as pixel and common electrodes. A liquid crystal layer is disposed between the substrates. Voltages are applied to the electric-field-generating electrodes, and the resulting electric field determines the alignment of liquid crystal molecules in the liquid crystal layer, which in turn affects the transmission of polarized incident light to generate a desired image.

In a vertical alignment (VA) mode LCD, the longitudinal axes of the liquid crystal molecules are perpendicular to the substrates when no electric field is formed in the liquid crystal layer. VA mode LCDs are popular due to their high contrast ratio and wide standard viewing angle. The standard viewing angle of a VA mode LCD can be widened by using domain-forming features, such as apertures or protrusions, on electric-field-generating electrodes. Patterns ("micropatterns) of the domain-forming features partition each pixel region into multiple domains. The liquid crystal molecules are tilted at the same angle in each domain, and possibly at different angles in different domains, in accordance with the micropattern geometry.

In some VA mode LCDs, the domain-forming patterns ("micropatterns") of apertures or protrusions are formed on both substrates. In other, "patternless" VA mode LCDs, a domain-forming pattern is formed one of the substrates but not on both. One drawback of the VA mode LCD having the domain-forming patterns on both substrates is a slow response time due to the random motion of the liquid crystal molecules located farther away from the domain-forming features. To solve this problem, studies are being conducted on narrowing the electric-field-generating electrodes of the VA mode LCD having the domain-forming patterns on both the upper and lower substrates and widening the domain-forming features. This however would result in a reduced aperture ratio. The patternless VA mode LCDs also have a slow response time due to the random motion and further have a momentary residual image due to the formation of reverse domains.

Therefore, it is desirable to provide an LCD with improved response time and without a reduction in the aperture ratio or formation a momentary residual image.

SUMMARY

Some embodiments of the present invention provide a liquid crystal display (LCD) with an improved response time. Some embodiments of the present invention also provide a method of fabricating the LCD. However, the present invention is not restricted to the embodiments described in this section. The invention is defined by the appended claims.

Some embodiments of the present invention include a liquid crystal display (LCD) comprising: a first substrate comprising a pixel electrode comprising one or more first domain-forming features and further comprising a first vertical alignment film disposed on the pixel electrode; a second substrate facing the first substrate and comprising a common electrode which comprises one or more second domain-forming features and further comprises a second vertical alignment film disposed on the common electrode; and a liquid crystal compound interposed between the first and second substrates, wherein the liquid crystal compound comprises liquid crystal molecules, ultraviolet (UV) hardening monomers and UV hardening initiators, and the liquid crystal molecules are pre-tilted to form an angle greater than 88 degrees but less than 90 degrees with respect to the first substrate when no driving power is applied to the pixel and common electrodes.

Some embodiments of the present invention include an LCD comprising: a first substrate comprising: a pixel electrode which comprises a plurality of microelectrodes and a plurality of microslits between the microelectrodes, and a first vertical alignment film on the pixel electrode; a second substrate facing the first substrate and comprising an un-patterned common electrode and a second vertical alignment film on the common electrode; and a liquid crystal compound between the first and second substrates, wherein the liquid crystal compound comprises liquid crystal, UV hardening monomers and UV hardening initiators.

Some embodiments of the present invention include a method of fabricating an LCD, the method comprising: providing a first substrate which comprises: a pixel electrode having one or more first domain-forming features, and a first vertical alignment film disposed on the pixel electrode; placing a second substrate to face the first substrate, wherein the second substrate comprises a common electrode having one or more second domain-forming features and also comprises a second vertical alignment film disposed on the common electrode; providing a mixture of liquid crystal, UV hardening monomers and UV hardening initiators between the first and second substrates; and forming a liquid crystal compound from said mixture, wherein forming the liquid crystal compound comprises applying power to the first and second substrates to pre-tilt the liquid crystal's molecules and irradiating the first and second substrates with UV light.

Some embodiments of the present invention include a method of fabricating an LCD, the method comprising: providing a first substrate comprising: a pixel electrode comprising a plurality of microelectrodes and a plurality of microslits interposed between the microelectrodes, the first substrate also comprising a first vertical alignment film on the pixel electrode; placing a second substrate to face the first substrate, the second substrate comprising an un-patterned common electrode and a second vertical alignment film on the common electrode; providing a mixture of liquid crystal, UV hardening monomers and UV hardening initiators between the first and second substrates; and forming a liquid crystal compound made from said mixture, wherein forming the liquid crystal compound comprises applying power to the first and second substrates to pre-tilt the liquid crystal's molecules and irradiating the first and second substrates with UV light.

BRIEF DESCRIPTION OF THE DRAWINGS

FIGS. 12 through 15 are cross-sectional views illustrating different stages of fabrication of an LCD according to the second embodiment of the present invention;

DETAILED DESCRIPTION OF EXEMPLARY EMBODIMENTS

Figure 1:
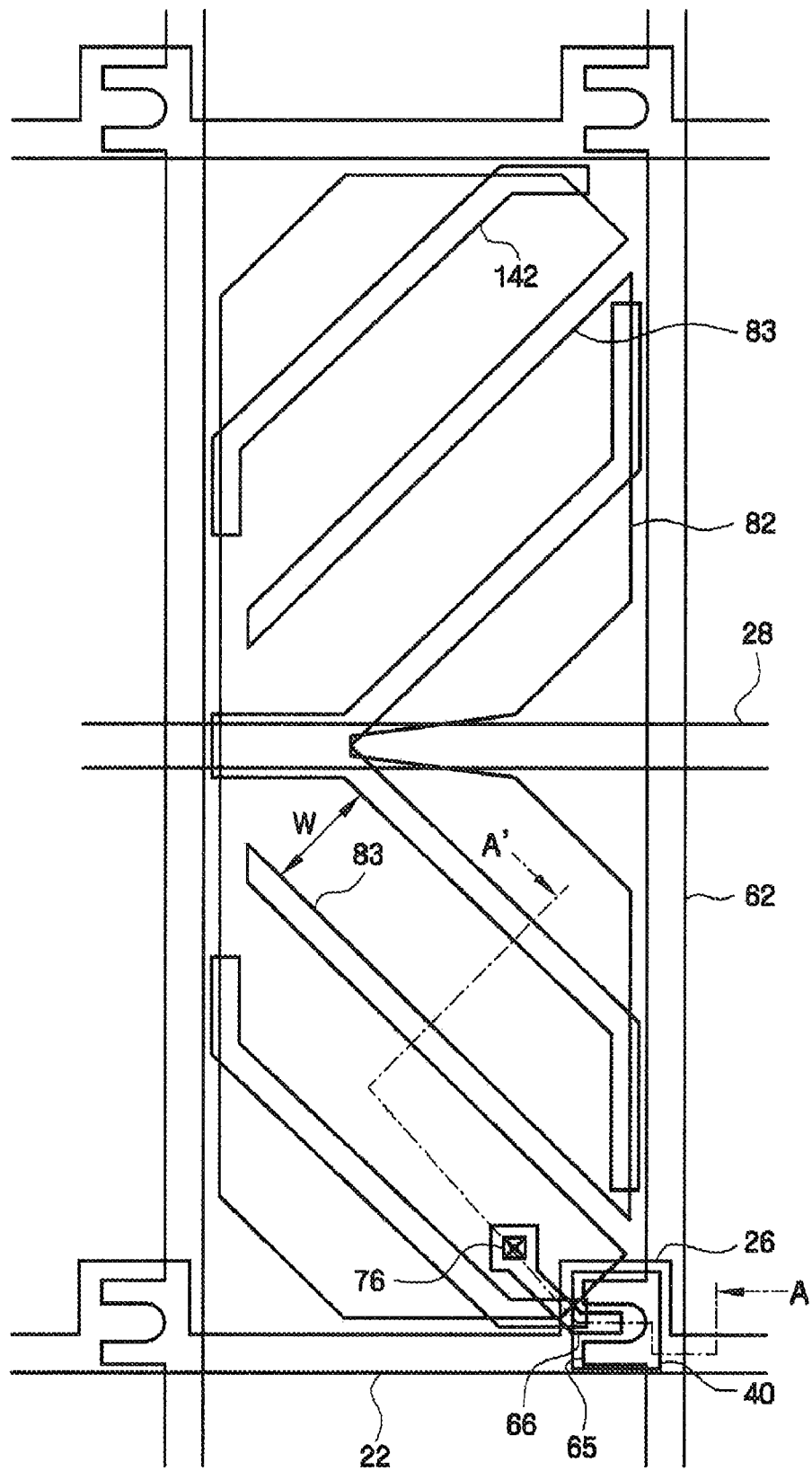
FIG. 1 is a layout view of a liquid crystal display (LCD) according to a first embodiment of the present invention.

Some embodiments of the present invention will now be described with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings indicate like elements, and repetitive description has been omitted.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

Spatially relative terms, such as "below", "beneath", "lower", "above", "upper", and the like, may be used herein for ease of description to describe one device or element's relationship to (an)other device(s) or element(s) as illustrated in the drawings. It will be understood that the spatially relative terms are not intended to limit possible orientation of the device in use or operation.

Figure 2:
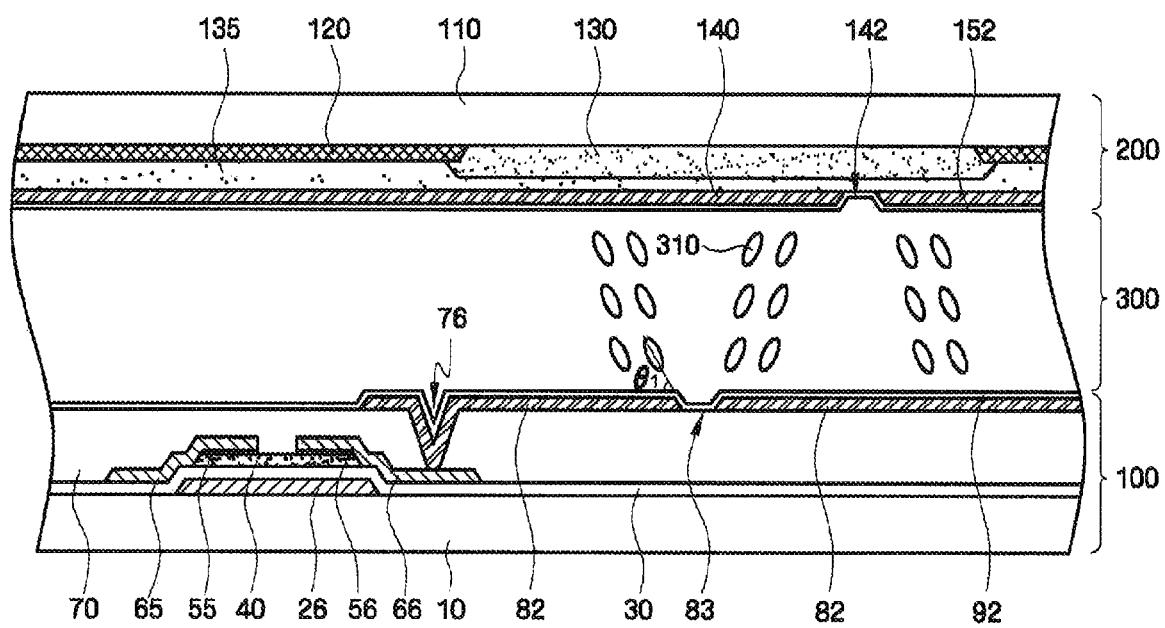
FIG. 2 is a cross-sectional view of the LCD taken along the line A-A' of FIG. 1.

A liquid crystal display (LCD) according to the first embodiment of the present invention will be now described with reference to FIGS. 1 and 2. FIG. 1 is a layout view of the LCD. FIG. 2 is a cross-sectional view of the LCD taken along the line A-A' of FIG. 1.

The LCD according to the present embodiment includes a first substrate 100 and a second substrate 200 facing each other and a liquid crystal compound 300 interposed between the first and second substrates 100 and 200.

The first substrate 100 of the LCD includes a plurality of elements such as pixel electrodes 82, which are formed on an insulating substrate 10 and have first domain-forming patterns 83.

A gate wiring is formed on the insulating substrate 10. The gate wiring includes gate lines 22 extending, for example, horizontally in the view of FIG. 1. The gate wiring also includes gate electrodes 26 and storage wiring 28. A gate insulating film 30, a semiconductor layer 40, and ohmic contact layers 55 and 56 are sequentially formed on the gate wiring. The gate insulating film 30 is formed of $Si_xN_y$, silicon oxide or a like material, and the semiconductor layer 40 is formed of hydrogenated amorphous silicon or polycrystalline silicon. The ohmic contact layers 55 and 56 are formed of a silicide or a material heavily doped with n-type impurities, such as n+ hydrogenated amorphous silicon.

Data wiring is formed on the ohmic contact layers 55 and 56 and the gate insulating film 30. The data wiring includes data lines 62 extending, for example, vertically in the view of FIG. 1. The data wiring also includes source electrodes 65 and drain electrodes 66.

A protective dielectric film 70 is disposed on the data lines 62, the drain electrodes 66, and the exposed portions of the semiconductor layer 40. Contact holes 76 are formed in the protective film 70 to expose the drain electrodes 66.

In each pixel, the pixel electrode 82 is formed on the protective film 70 and is electrically connected to the drain electrode 66 through the contact hole 76. In other words, the pixel electrode 82 is physically and electrically connected to the drain electrode 66 through the contact hole 76, and thus receives a data voltage from the drain electrode 66. The pixel electrode 82 is formed of a transparent conductor, such as indium tin oxide (ITO) or indium zinc oxide (IZO), or a reflective conductor such as aluminum.

The pixel electrode 82 is partitioned into a plurality of domains by the first domain-forming pattern 83. The first domain-forming pattern 83 may be an incision pattern (an aperture pattern) formed at the time when the pixel electrode 82 is patterned.

In each pixel, the first domain-forming pattern 83 includes a horizontal part, which extends horizontally (in the view of FIG. 1) along the midline of the pixel electrode 82, and oblique parts formed above and below the midline, i.e. in each of the upper and lower halves of the pixel electrode 82. The oblique parts of the first domain-forming pattern 83 above and below the midline of the pixel electrode 82 will be called herein the upper and lower portions of the first domain-forming pattern 83 respectively. The upper and lower portions of the domain-forming pattern 83 are formed perpendicular to each other in order to evenly distribute the horizontal electric field in four directions. The oblique parts include a part at an angle of substantially 45 degrees with respect to the gate line 22 and a part at an angle of substantially −45 degrees with respect to the gate line 22. The first domain-forming pattern 83 may have a mirrored structure in which its upper and lower portions are substantially symmetrical to each other with respect to a line (parallel to the gate line 22) that partitions the pixel region into the upper and lower halves. For example, as illustrated in FIG. 1, the upper portion of the first domain-forming pattern 83 may form the angle of substantially 45 degrees with respect to the gate line 22, and the lower portion of the first domain-forming pattern 83 may form the angle of substantially −45 degrees with respect to the gate line 22. However, the present invention is not limited to such geometry. Other shapes and arrangements of the oblique parts are possible.

The first domain-forming pattern 83 of the pixel electrode 82 and a second domain-forming pattern 142 of a common electrode 140, which will be described later, partition the pixel region of the pixel electrode 82 into a plurality of domains. In each domain, the main directors of liquid crystal molecules 310 of the liquid crystal compound 300 are parallel to each other when an electric field is applied to the liquid crystal compound 300. A domain is a region in which the liquid crystal molecules' directors tilt together at the same angle when an electric field is applied between the pixel electrode 82 and the common electrode 140.

In the present embodiment, the lateral distance W (i.e. the distance measured in the plane of FIG. 1) between an oblique part of the first domain-forming pattern 83 of the pixel electrode 82 and a laterally adjacent part of the second domain-forming pattern 142 of the common electrode 140, which will be described later, may be in the range of 23 to 70 μm. Such large lateral distance W may enhance optical transmission of the LCD, but may allow random motion of the liquid crystal molecules 310. However, the random motion of the liquid crystal molecules 310 can be suppressed by pre-tilting the liquid crystal molecules 310 through ultraviolet (UV) processing.

A first vertical alignment film 92 is formed on the pixel electrode 82 and the protective film 70 to align the liquid crystal molecules 310. The first vertical alignment film 92 and a second vertical alignment film 152, which will be described later, vertically align the liquid crystal molecules 310. Accordingly, when no driving voltage is applied to the LCD, a clear black color is displayed on the LCD. The first vertical alignment film 92 may be formed of a material which has, e.g., polyimide as a main chain and has a side chain.

The second substrate 200 includes the common electrode 140 which is formed on an insulating substrate 110 and has the second domain-forming pattern 142.

A black matrix 120, which prevents leakage of light and defines pixel regions, is formed on the insulating substrate 110. Red, green and blue (RGB) color filters 130 are sequentially arranged in the consecutive pixel regions at the locations of the openings in the black matrix 120. An overcoat layer 135 may be formed on the RGB color filters 130 to provide a planar surface above the steps formed by the RGB color filters 130. The common electrode 140 is formed of a transparent conductive material, such as ITO or IZO, on the overcoat layer 135.

The common electrode 140 is partitioned into a plurality of domains by the second domain-forming pattern 142. The second domain-forming pattern 142 may be an incision pattern (an aperture pattern) formed at the time when the common electrode 142 is patterned.

In the view of FIG. 1, the second domain-forming pattern 142 includes oblique parts which alternate with, and are parallel to, the oblique parts of the first domain-forming patterns 83. Each oblique part of the second domain-forming pattern 142 may have a vertical end and a horizontal end. The ends of each oblique part of the domain-forming pattern 142 overlap edges of a pixel electrode 82.

As stated above, the oblique parts of the first domain-forming pattern 83 of the pixel electrode 82 and the oblique parts of the second domain-forming pattern 142 of the common electrode 140 may be parallel to each other and may alternate with each other when viewed from above (as in FIG. 1), to shape horizontal components of the electric field when power is supplied.

The invention is not limited to the domain features made of apertures. The domain-forming patterns 83, 142 can alternatively formed by protrusions on the pixel electrodes 82 and the common electrode 140.

The second vertical alignment film 152 is formed on the common electrode 140, to provide vertical alignment of the liquid crystal molecules 310. The second vertical alignment film 152 may be formed of the same material as the first vertical alignment film 92. As explained above, the first and second vertical alignment films 92 and 152 allow reliable display of the black color in the initial state, when no driving power is applied to the LCD. In addition, when the first and second vertical alignment films 92 and 152 are implemented, the content of UV monomers can be reduced as compared to when a separate alignment film is formed by interposing another liquid crystal compound between the first and second substrates 100 and 200 at the location of the liquid crystal compound 300 and hardening another liquid crystal. Consequently, the reliability of the LCD can be enhanced.

The liquid crystal compound 300 is made from the liquid crystal 310, UV hardening monomers and UV hardening initiators between the first and second substrates 100 and 200.

The liquid crystal 310 in the liquid crystal compound 300 may have negative dielectric anisotropy and may be nematic. The UV hardening monomers may be, for example, acrylate monomers, and the UV hardening initiators may be formed of materials that can absorb UV light; for example, the UV hardening initiators may be 2,2-dimethoxy-1,2-diphenyl ethanone.

The liquid crystal compound 300 includes more than 0 weight percent(wt %) but less than 0.05 weight percent of UV hardening initiators based on the liquid crystals 310, and more than 0 weight percent but less than 10 weight percent of UV hardening monomers based on the liquid crystals 310. Desirably, the liquid crystal compound 300 includes more than 0.025 weight percent but less than 0.05 weight percent of UV hardening initiators based on the liquid crystals 310 and more than 0 weight percent but less than 0.05 weight percent of UV hardening monomers based on the liquid crystals 310. If lower amounts of the UV hardening initiators and the UV hardening monomers are present, the LCD luminance can be lowered. On the other hand, if of the content of the UV hardening initiators and the UV hardening monomers exceeds 0.05 weight percent, the LCD reliability can suffer.

During fabrication, the liquid crystal 310 is irradiated with UV light in order to pre-tilt the liquid crystal molecules 310 at an angle $\theta_1$ of more than 88 degrees but less than 90 degrees with respect to the first substrate 100, and this angle is obtained in normal operation when no driving power is applied to the first and second substrates 100 and 200. Therefore, the random motion of the liquid crystal molecules 310 is suppressed, and the response time is improved when driving power is applied. Generally, the random motion increases with the driving power in a patternless vertical alignment (PVA) mode LCD. Consequently, the response time of the PVA mode LCD is increased. However, since the liquid crystal molecules 310 of the LCD according to the present embodiment are pre-tilted, the random motion of the liquid crystals 310 is suppressed. Therefore, even if strong driving power is applied to the LCD to enhance optical transmission, the LCD responds fast. The pre-tilt angle of the liquid crystals 310 may be more than 88.5 degrees but less than 90 degrees with respect to the first substrate 100.

A polarizer may be formed on the rear surface of each of the first and second substrates 100 and 200. A backlight assembly with lamps is disposed under the liquid crystal panel that includes the first and second substrates 100 and 200 and the liquid crystal compound 300 interposed between the first and second substrate 100 and 200.

Since the liquid crystal molecules 310 of the LCD according to the present embodiment are pre-tilted, the random motion of the liquid crystal molecules 310 is suppressed. Accordingly, the response time of the LCD is improved, and the optical transmittance can be increased by increasing the lateral distance W.

One possible method of fabricating an LCD according to the first embodiment of the present invention will now be described with reference to FIGS. 3 through 6. FIGS. 3 through 6 are cross-sectional views illustrating the LCD at different stages of fabrication.

Figure 3:
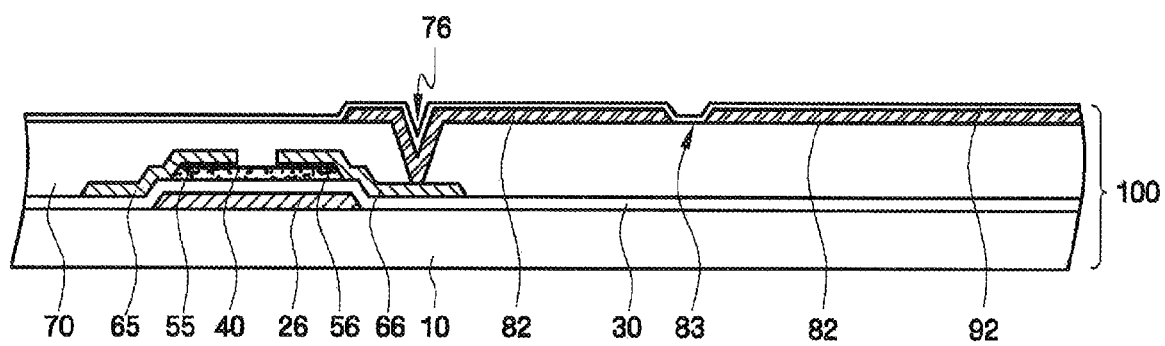
FIGS. 3 through 6 are cross-sectional views illustrating different stages of fabrication of an LCD according to the first embodiment of the present invention.

FIG. 3 illustrates fabrication of the first substrate 100. A metal film is deposited (e.g. sputtered) on the insulating substrate 10 and patterned to form the gate wiring. The gate wiring includes the gate lines 22, the gate electrodes 26 and the storage electrodes 28.

The gate insulating film 30 is formed on the gate wiring, possibly by plasma enhanced chemical vapor deposition (PECVD). The gate insulating film 30 can be $Si_xN_y$ or another suitable material.

The semiconductor layer 40 is formed on the gate insulating film 30. Layer 40 can be hydrogenated amorphous silicon, polycrystalline silicon, or heavily n+ doped hydrogenated amorphous silicon. Then a conductive film is deposited, possibly by sputtering, to provide data wiring. The conductive film and the semiconductor layer 40 are then patterned photolithographically. The semiconductor features 40, the ohmic contact layers 55 and 56, and data wiring features including the data lines 62, the source electrodes 65 and the drain electrodes 66 are formed as a result.

The protective film 70 is formed on the resultant structure, by reactive CVD for example. Contact holes 76 are then formed to partially expose the respective drain electrodes 66.

A conductive layer is formed on the protective film 70, by sputtering for example, and is patterned to provide the pixel electrodes 82 with their first domain-forming patterns 83. The first domain-forming pattern 83 has horizontal and oblique parts as explained above. The parts of the first domain-forming pattern 83 are narrow, and the pixel electrodes 82 are wide, in order to enhance optical transmission. The lateral distance W between each oblique part of the first domain-forming pattern 83 of the pixel electrode 82 and a laterally adjacent part of the second domain-forming pattern 142 of the common electrode 140, which will be described later, may be in the range of 23 to 70 μm.

Finally, the first vertical alignment film 92 is formed by printing. In this process, a sealant may be printed along edges of the first substrate 100.

Figure 4:
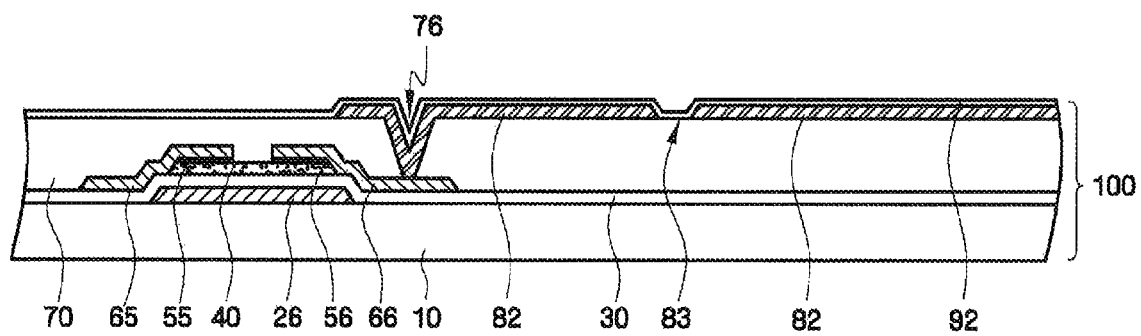

FIG. 4 shows the second substrate 200 with the common electrode 140 thereon. The common electrode 140 includes the second domain-forming pattern 142. The second substrate 200 is placed opposite the first substrate 100.

In order to form the second substrate 200, an opaque material, such as chrome, is deposited on the insulating substrate 110. The opaque material is patterned to form the black matrix 120.

A color filter layer is formed from a suitable material, a photoresist for example. The color filter layer is placed on the black matrix 120 and the exposed portions of the insulating substrate 110. The color filter layer is exposed and developed.

As a result, RGB color filters 130 are formed. Then the overcoat layer 135 is formed on the black matrix 120 and the RGB color filters 130.

A conductive layer is formed on the overcoat layer 135 and patterned to provide the common electrode 140 with its second domain-forming pattern 142.

Next, the second vertical alignment film 152 is formed on the common electrode 140 by printing. In this process, the common electrode 140 can be coated with a spacer layer which will maintain a desired distance (a cell gap) between the first and second substrates 100 and 200.

The second substrate 200, fabricated as described above, is placed opposite the first substrate 100. A sealant is deposited and hardened to bond the first and second substrates 100 and 200 together.

Figure 5:
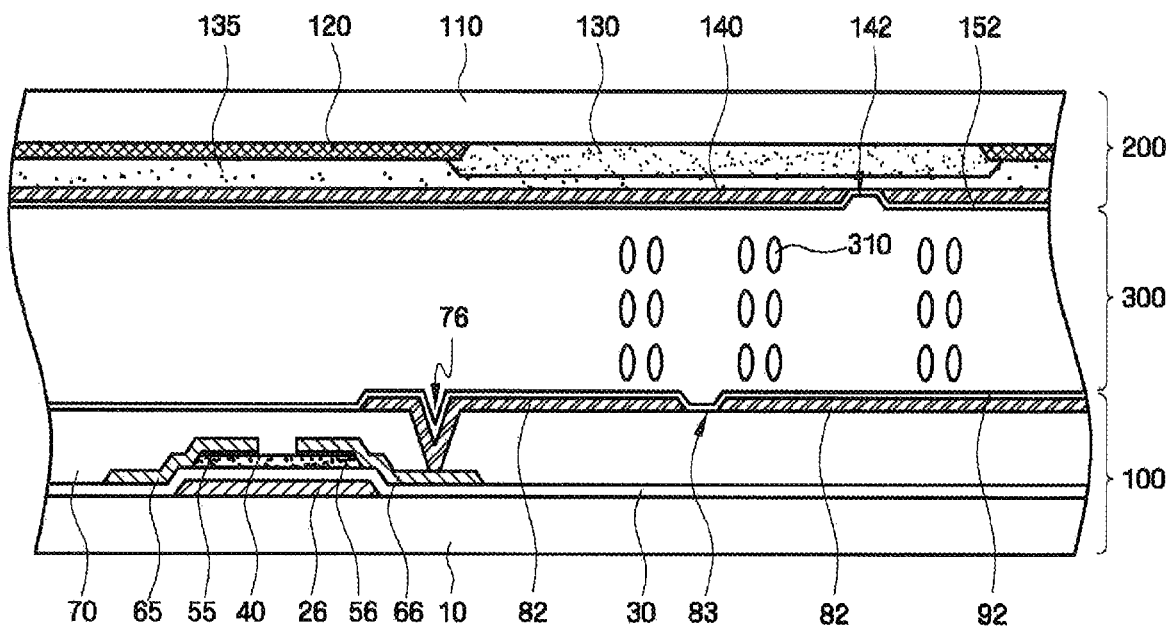

Referring to FIG. 5, a mixture of liquid crystal 310, UV hardening monomers, and UV hardening initiators is provided between the first and second substrates 100 and 200, by vacuum injection for example. The liquid crystal 310 may have negative dielectric anisotropy and may be nematic. The UV hardening monomers may be, for example, acrylate monomers, and the UV hardening initiators may be formed of materials that can absorb UV light. The UV hardening initiators may be 2,2-dimethoxy-1,2-diphenyl ethanone. The amount of the UV hardening initiators may be more than 0 weight percent but less than 0.05 weight percent based on the liquid crystal 310, and the amount of the UV hardening monomers may be more than 0 weight percent but less than 10 weight percent based on the liquid crystals 310. Desirably, the amount of the UV hardening initiators may be more than 0.025 weight percent but less than 0.05 weight percent based on the liquid crystals 310, and the amount of the UV hardening monomers may be more than 0 weight percent but less than 0.05 weight percent based on the liquid crystals 310.

Figure 6:
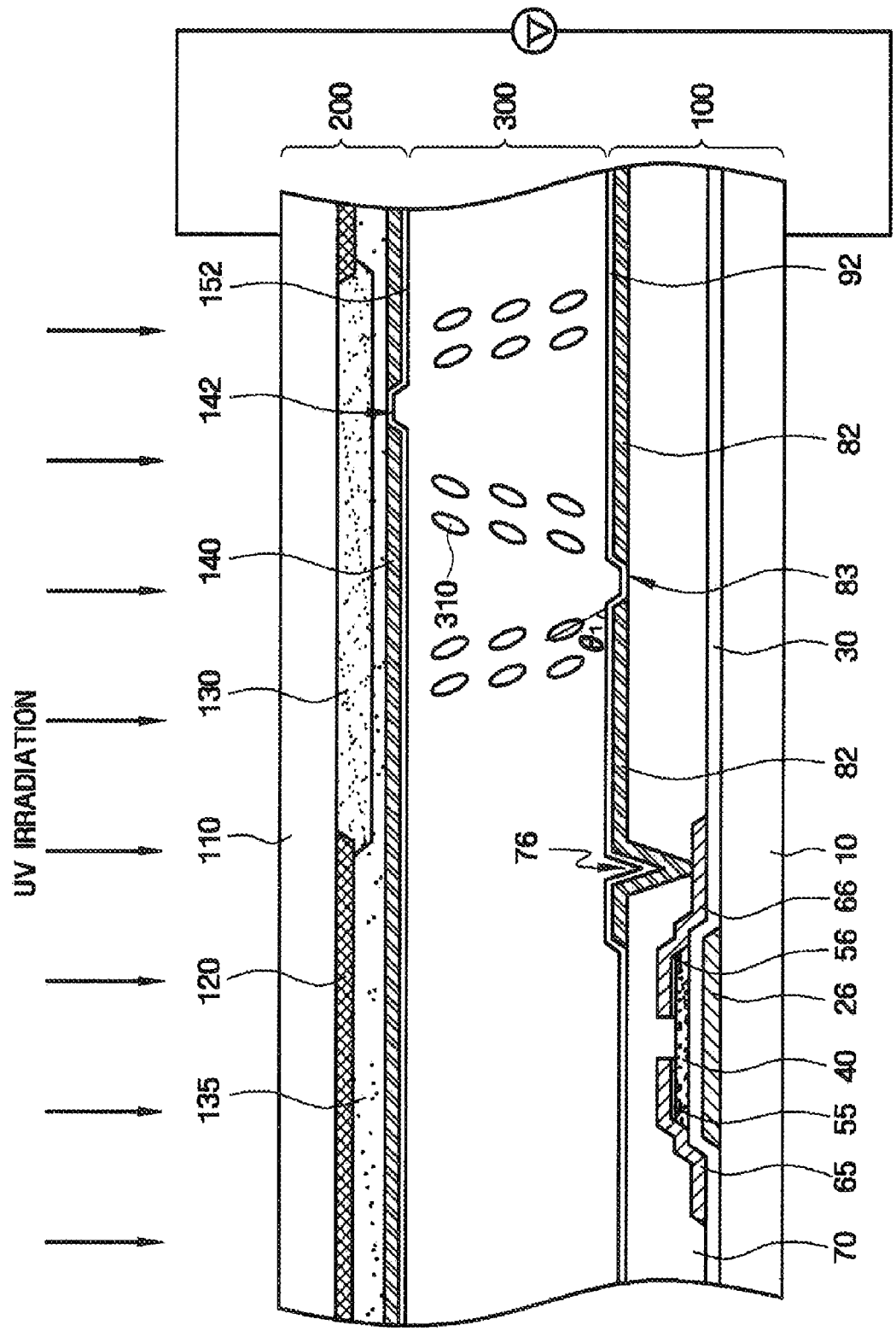

Referring to FIG. 6, power ("pre-tilt power") is applied to the first and second substrates 100 and 200 to pre-tilt the liquid crystal molecules 310. The pre-tilt power may be applied to the first and second substrates 100 and 200 through a pad portion for visual inspection or a separate pad portion. With the pre-tilt power applied to the first and second substrates 100 and 200, UV light is emitted to the first and second substrates 100 and 200 to turn the mixture of liquid crystal 310 and the UV monomers and initiators into the liquid crystal compound 300. A suitable voltage range for the pre-tilt power application is 2 to 10 V (this voltage is also referred to as "pre-tilt voltage" or "UV hardening voltage" herein). Either alternating or direct current can be used. In some embodiments, the energy supplied to the LCD by the UV light is 2 to 36 J per one $cm^2$ of the area of the pixel electrodes 82, and the UV light wavelength is 320 to 380 nm. Other parameters may also be used, and may vary depending on the amount of the UV hardening monomers. The UV irradiation may be performed immediately after the introduction of the liquid crystal 310 between the first and second substrates 100, 200 so that the monomers do not harden before the UV irradiation process.

As described above, when the power is applied to the LCD and UV light is emitted to the LCD, the UV hardening monomers harden, causing the liquid crystal molecules 310 to pre-tilt. The pre-tilt power intensity is maintained constant and such that the liquid crystal molecules 310 are pre-tilted at the angle $\theta_1$ of more than 88 degrees but less than 90 degrees with respect to the first substrate 100. In some embodiments, the angle $\theta_1$ is more than 88.5 degrees but less than 90 degrees.

Since the liquid crystal molecules 310 are pre-tilted at the above angle $\theta_1$ as defined by the first and second domain-forming patterns 83 and 142, the random motion of the liquid crystal molecules 310 is suppressed when power is later applied to the LCD in normal operation. Accordingly, the LCD response time, defined as the time of the display transition from black to white, is improved.

Figure 7:
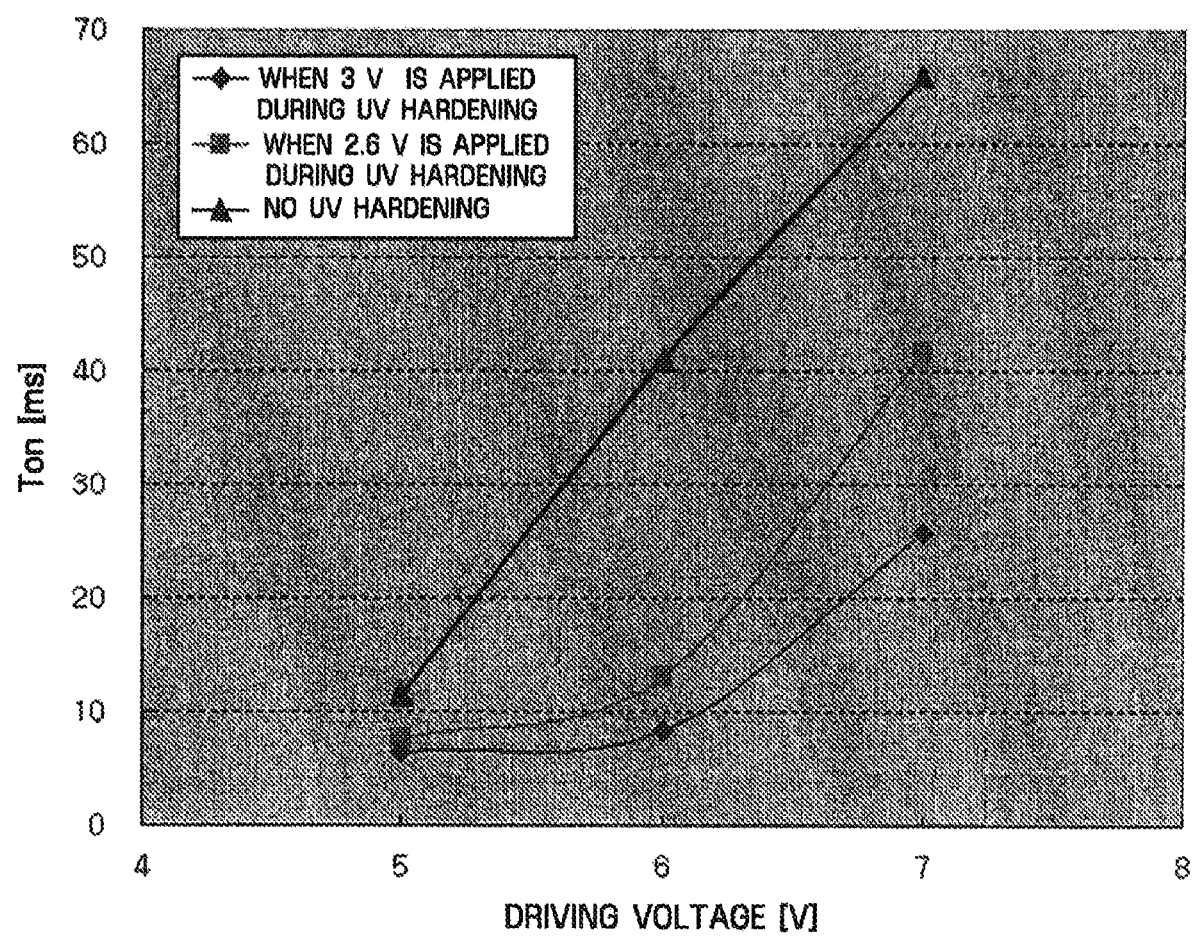
FIG. 7 is a graph illustrating the response times of an LCD according to the first embodiment of the present invention for different UV hardening voltages.
Figure 8:
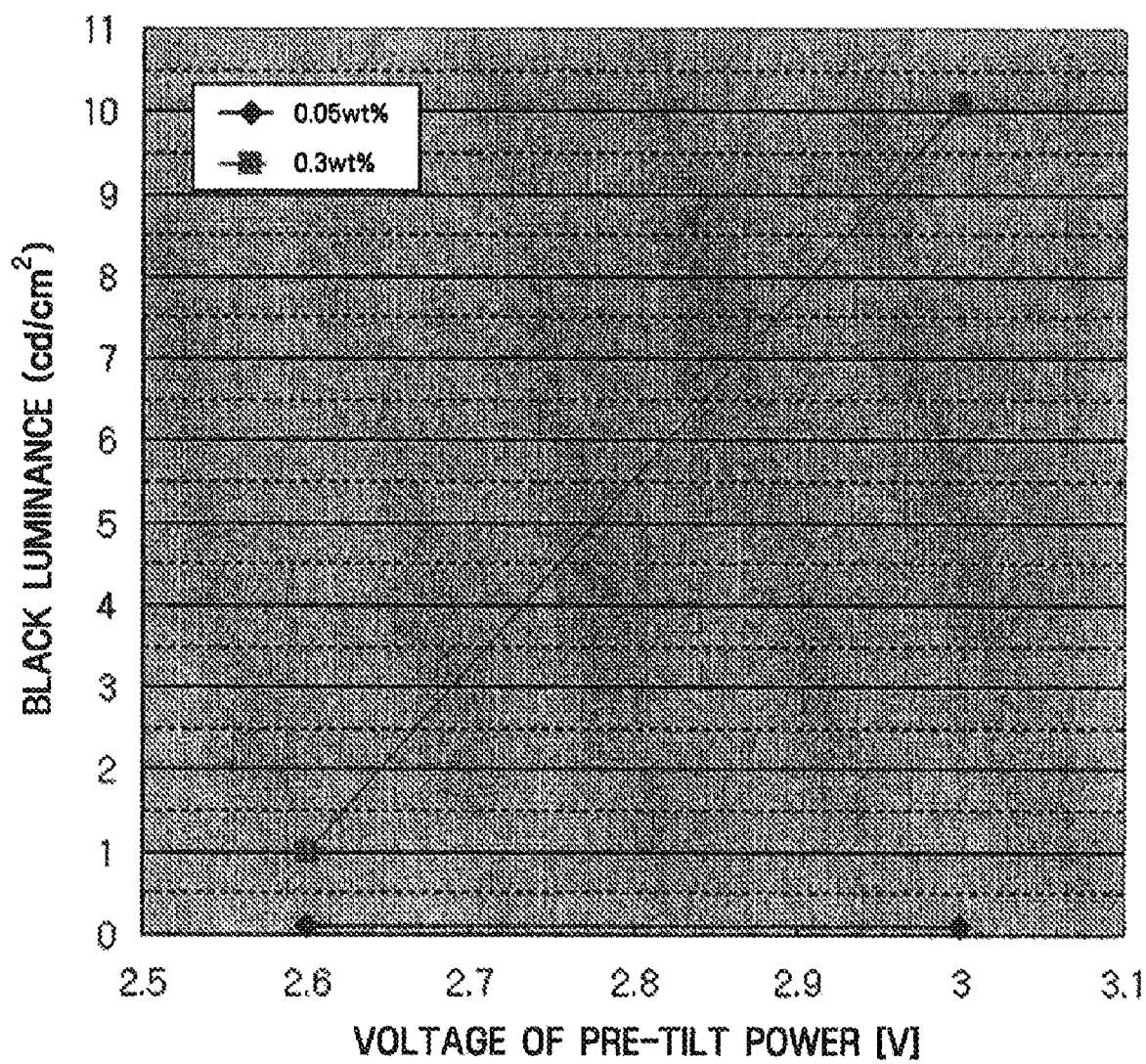
FIG. 8 is a graph illustrating the correlation between the UV monomer content in an LCD according to the first embodiment of the present invention and the black luminance of the LCD.

The LCD performance depends on the composition of liquid crystal compound 310 and on the UV radiation parameters, as illustrated in FIGS. 7 and 8. FIG. 7 is a graph illustrating the response time of an LCD of the first embodiment of the present invention as a function of the UV hardening method. FIG. 8 is a graph illustrating the correlation between the amount of monomers used to fabricate an LCD of the first embodiment of the present invention on the one hand and the black luminance of the LCD on the other hand.

In FIG. 7, it is assumed that the cell gap of the LCD is 3.5 μm and that the LCD includes 0.05 weight percent of UV hardening monomers based on liquid crystals. The distance W (FIG. 1) is assumed to be 23 μm. In this case, the LCD response time, defined as the time required for the image transition from black to white, is shorter for an LCD manufactured with UV hardening than for an LCD manufactured without UV hardening. Moreover, the response time decreases if the UV hardening voltage is increased. Thus, the LCD response time is shortened if the UV hardening is applied and if the UV hardening voltage is higher.

Referring to FIG. 8, when the LCD includes 0.05 weight percent of UV hardening monomers based on liquid crystals, even if the UV hardening voltage is increased, the black luminance of the LCD does not increase. However, when the LCD includes 3 weight percent of UV hardening monomers based on the liquid crystals, if the UV hardening voltage increases, the black luminance of the LCD also increases. Therefore, in some embodiments of the present invention, the amount of the UV hardening monomers does not exceed 0.05 weight percent. As a result, the LCD response time is improved without compromising the black color, which is the color displayed when no power is applied.

Referring to FIG. 6, a polarizer (not shown) may be supplied on the rear surface of each of the first and second substrates 100 and 200 after the UV irradiation.

The invention is not limited to the fabrication sequence described above, and in particular to performing the UV radiation after the fabrication of the first and second substrates 100, 200. In some embodiments, for example, a plurality of first substrates 100 are formed in a first mother substrate, a plurality of second substrates 200 are formed in a second mother substrate, then the first and second mother substrates are bonded together and the liquid crystal 310 is injected therebetween. Then pre-tilt power is applied to the first and second mother substrates, and they are irradiated with UV light to form the liquid crystal compound 300 with the pre-tilted liquid crystal molecules 310. Then the first and second mother substrates are cut up into a plurality of liquid crystal panels each of which includes one first substrate 100 and one second substrate 200 for use in a single LCD. Next, a backlight assembly with lamps is provided under the liquid crystal panel, thereby completing the LCD fabrication.

Figure 9:
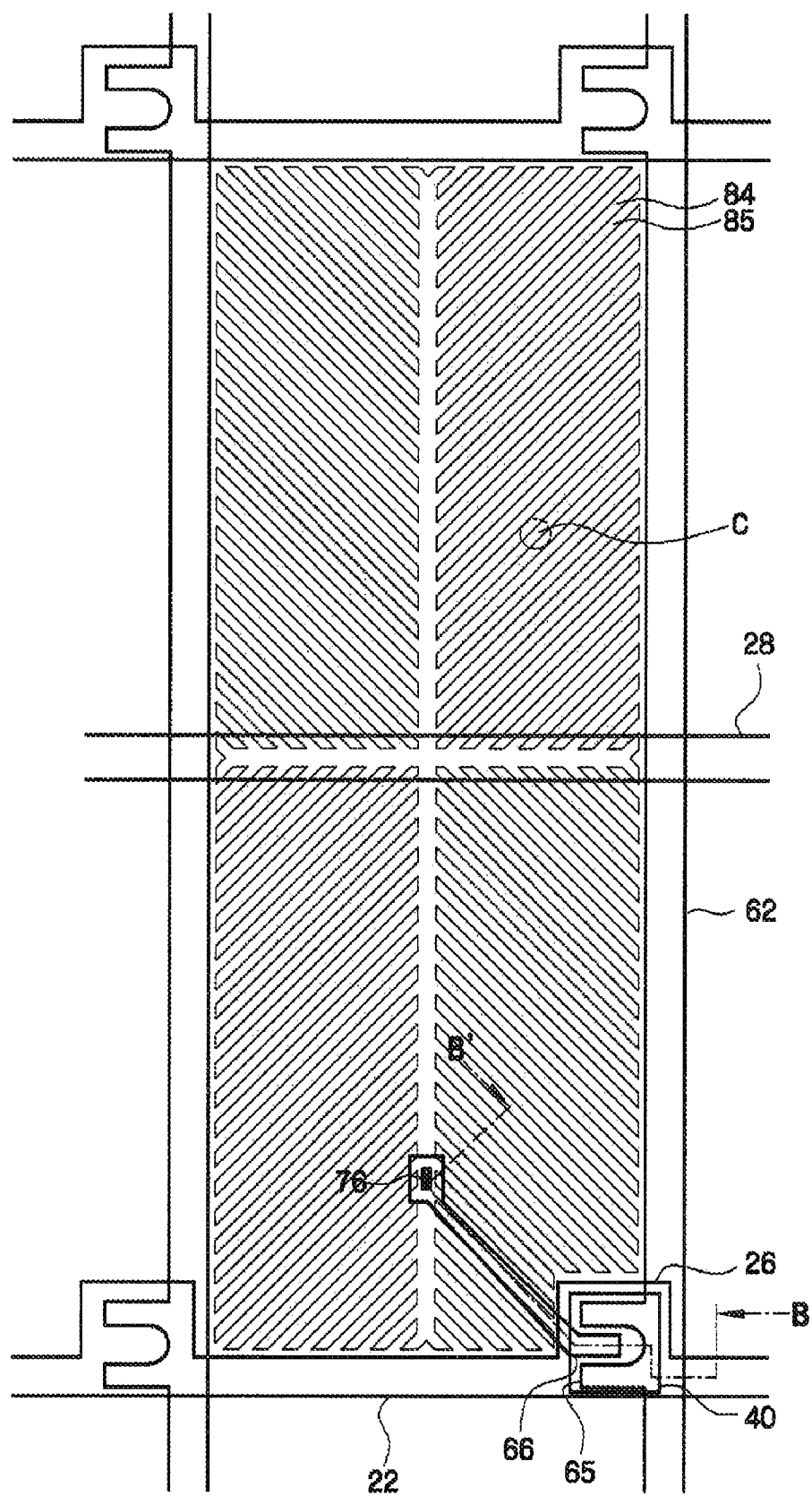
FIG. 9 is a layout view of an LCD according to a second embodiment of the present invention.
Figure 10:
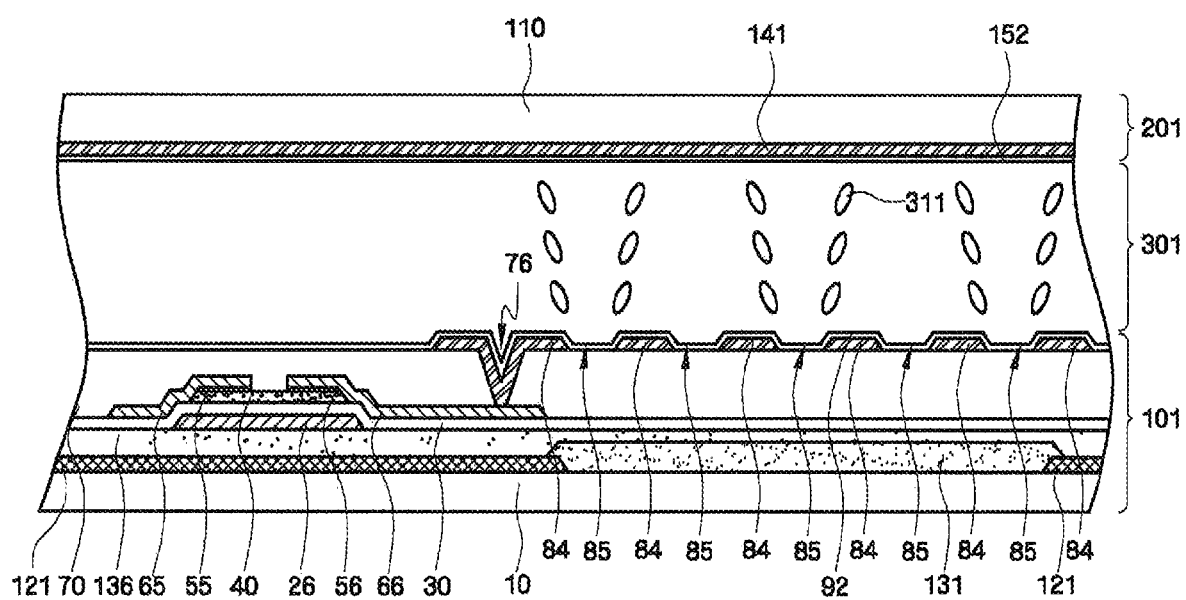
FIG. 10 is a cross-sectional view of the LCD taken along the line B-B' of FIG. 9.
Figure 11:
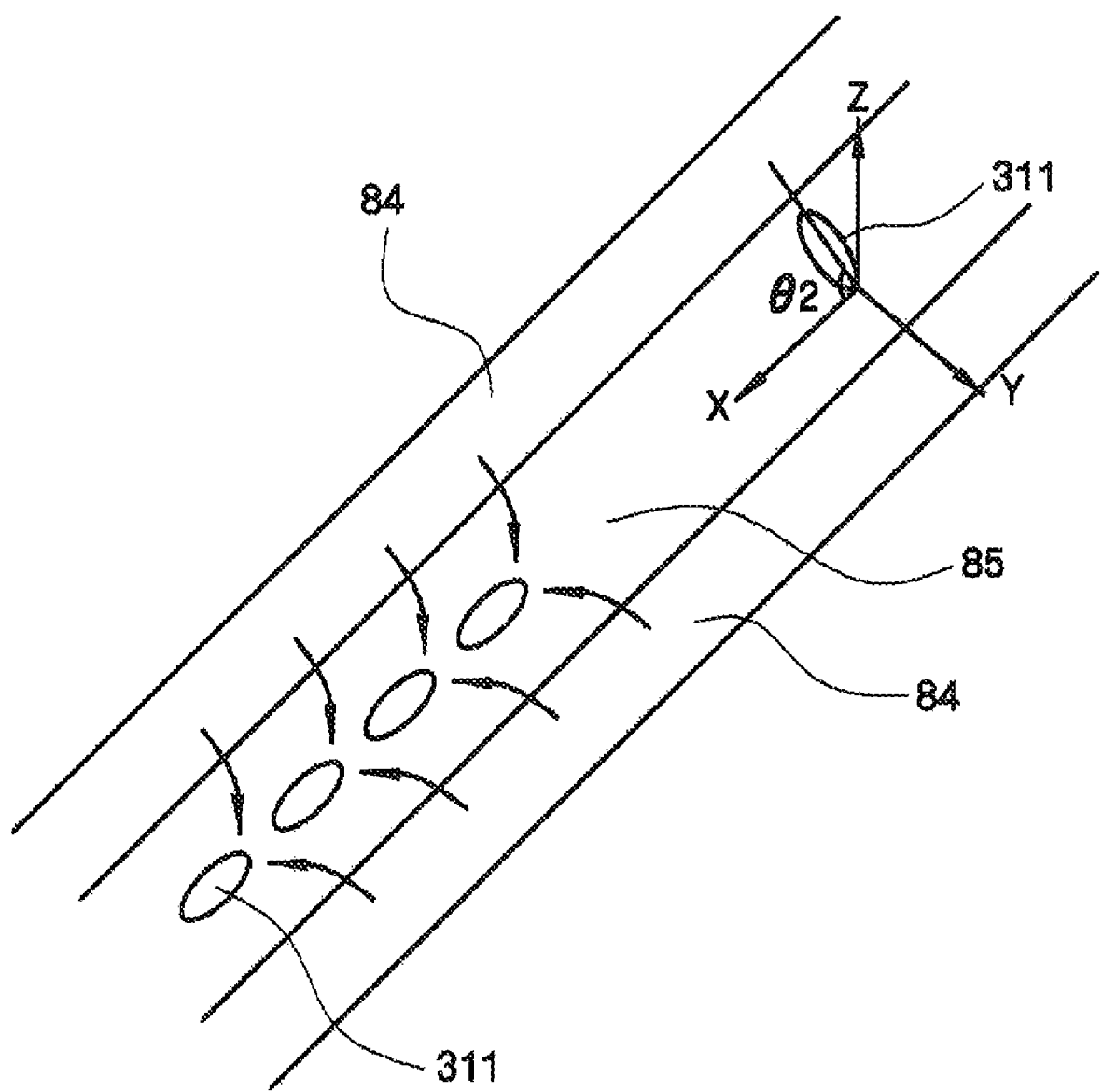
FIG. 11 is an enlarged view illustrating the motion of liquid crystal molecules located at a portion C in FIG. 9.

An LCD according to a second embodiment of the present invention is illustrated in FIGS. 9 through 11. FIG. 9 is a layout view of the LCD. FIG. 10 is a cross-sectional view of the LCD taken along the line B-B' of FIG. 9. FIG. 11 is an enlarged view illustrating the motion of liquid crystal molecules located at a portion C in FIG. 9. For ease of description, elements identical to those in the previous embodiment are indicated by identical reference numerals, and a description thereof has been omitted or simplified.

The LCD of the second embodiment includes a first substrate 101 and a second substrate 201 coupled to each other. Unlike in the LCD of the previous embodiment, RGB color filters 131 in the present embodiment are formed on the same first substrate 101 as the pixel electrodes. The LCD according to the present embodiment may have an array on color filter (AOC) structure in which the gate wiring of the thin film transistor (TFT) array is formed on the RGB color filters 131, or a color filter on array (COA) structure in which the RGB color filters 131 are formed on the TFT array. For the present embodiment, the AOC structure is described as an example.

A black matrix 121 is formed directly on an insulating substrate 10 of the first substrate 101. The RGB color filters 131 are sequentially arranged in the consecutive pixel regions at the locations of the openings in the black matrix 121. An overcoat layer 136 provides a planar surface above the steps formed by the RGB color filters 131.

Formed like in the previous embodiment are: gate wiring, which includes gate lines 22, gate electrodes 26, and storage wiring 28; gate insulating film 30; semiconductor layer 40; ohmic contact layers 55 and 56; and data wiring, which includes data lines 62, source electrodes 65, and drain electrodes 66. Protective film 70 with contact holes 76 is formed on the data wiring, and the pixel electrodes are disposed on the protective film 70.

Each pixel electrode according to the present embodiment includes a plurality of microelectrodes 84 separated by microslits 85. The pixel electrode incorporates a cross-shaped main framework which divides the pixel region into four sub-regions. The microelectrodes 84 stretch obliquely from the main framework toward the periphery of the pixel region. The microslits 85 are located between the microelectrodes 84. The microelectrodes 84 may be at an angle of approximately 45 degrees with respect to a transmission axis of the polarizer (which is described below). The microelectrodes 84 extend in four different directions from the center of the pixel region. Accordingly, when driving power is applied to the LCD, liquid crystal molecules 311, described below, are oriented in four different directions. In some embodiments, the maximum length of a microelectrode 84 does not exceed $0.5^{1/2}$ times the horizontal length of the pixel electrode to provide a short response time ("horizontal" refers to the view of FIG. 9, i.e. parallel to the gate lines). Thus, the maximum length of a microelectrode 84 does not exceed $0.5^{1/2}$ times the horizontal length of the cross-shaped main framework.

The width of each microelectrode 84 may be uniform, or may vary between the center of the pixel electrode, that is, the location where the microelectrode 84 meets the cross-shaped main framework, and the periphery of the pixel region. Whether or not the width of each microelectrode 84 is uniform throughout the microelectrode's length, different microelectrodes 84 and microslits 85 may be equal or different in width. In some examples, the microelectrodes 84 and the microslits 85 are each approximately 3 μm and 4 μm wide respectively. A microelectrode 84 may be wider at the center of the pixel electrode than at the edges of the pixel electrode. In this case, the liquid crystal molecules 311, which will be described later, are easily oriented in the microslits 85 interposed between the microelectrodes 84.

As in the previous embodiment, first vertical alignment film 92 is formed on the pixel electrode.

The second substrate 201 according to the present embodiment includes insulating substrate 110 and common electrode 141 formed on the insulating substrate 110 of a suitable material such as ITO. The second substrate 201 is placed opposite the first substrate 101. The common electrode 141 according to the present embodiment does not have a domain-forming pattern. Therefore, the manufacturing process is more tolerant to misalignment between the first and second substrates 101 and 201 when the two substrates are bonded together. In addition, since there is no need for anti-static processing, high optical transmission can be achieved, and manufacturing costs can be reduced.

A second vertical alignment film 152 is formed on the common electrode 141 to provide vertical alignment for the liquid crystal molecules 311. A spacer for maintaining a cell gap between the first and second substrates 101 and 201 may be provided between the first and second substrates 101 and 201.

A liquid crystal compound 301 is made from the liquid crystal 311 and dopants controlling the pitch of the liquid crystal 311 and is provided between the first and second substrates 101 and 201.

The present embodiment can be provided with chiral dopants having asymmetric carbon atoms at the center of the molecule. The dopants reduce the pitch of the liquid crystal 311. Since the response time of a VA mode LCD is reduced as the pitch is shortened, the dopants according to the present embodiment can improve the response time. The pitch of the liquid crystal 311 also affects the optical transmission. Therefore, in some implementations of the present embodiment, the ratio of the cell gap (the gap between the first and second substrate 101 and 201) to the pitch of the liquid crystal 311 is chosen to be 0.02 to 0.25.

As in the previous embodiment, the liquid crystal compound 301 according to the present embodiment may be formed by irradiating the mixture of the liquid crystal 311, the UV hardening monomers, and the UV hardening initiators with UV light.

Referring to FIG. 11, if the LCD is irradiated with UV light, the liquid crystal molecules 311 are pre-tilted toward the first substrate 101. Consequently, a two-step motion of the liquid crystal molecules 311 is prevented, and the formation of a reverse domain is hindered. More particularly, if an electric field is formed using only the microelectrodes 84 disposed on the first substrate 101, when the driving power is applied to the liquid crystal molecules 311, the liquid crystal molecules 311 may perform the two-step motion. The two-step motion includes a polar rotation in a direction perpendicular to the adjacent microelectrodes 84 and an azimuthal rotation in a direction parallel to the microslits 85 interposed between the adjacent microelectrode 84. As a result, the reverse domain may be formed. The reverse domain means the liquid crystal molecules 311 are oriented in opposite directions from one of the microslits 85 However, if the liquid crystal molecules 311 are pre-tilted and thus made to perform a one-step motion according to the present embodiment, the formation of the reverse domain is prevented. In addition, pre-tilting of the liquid crystal molecules 311 improves the LCD response time as described above. As in the previous embodiment, the pre-tilt angle $\theta_2$ of the liquid crystal molecules 311 is more than 88 degrees but less than 90 degrees, desirably more than 88.5 degrees but less than 90 degrees. Specifically, assuming that an x-axis is parallel to the microelectrodes 84, a y-axis is perpendicular to the microelectrodes 84, and a z-axis is perpendicular to the two axes, the liquid crystals 311 are tilted at the angle $\theta_2$ with respect to the x-axis in a plane formed by the x-axis and the z-axis.

The liquid crystal compound 301 according to the present embodiment may be formed by irradiating a mixture of the liquid crystal 311, the dopants, the UV hardening monomers and the UV hardening initiators with UV light. The dopants reduce the pitch of the liquid crystal 311, and the UV irradiation pre-tilts the liquid crystal molecules 311. Therefore, the response time of the LCD can be improved.

One possible method of fabricating an LCD according to the second embodiment of the present invention will now be described with reference to FIGS. 12 through 15. FIGS. 12 through 15 are cross-sectional views illustrating the LCD at different stages of fabrication. The description of elements common with the first embodiment of the present invention has been omitted or simplified.

FIG. 12 illustrates the first substrate 101. A pixel electrode is shown with its microelectrodes 84 and microslits 85 interposed between the microelectrodes 84. To fabricate the first substrate 101, an opaque material such as chrome is deposited on the insulating substrate 10 and then patterned to form the black matrix 121. Next, a coat of a suitable material, e.g. photoresist, is formed over the black matrix 121 and the insulating substrate 10. The photoresist is exposed and developed. RGB color filters 131 are formed as a result. Then an overcoat layer 136 is formed on the black matrix 121 and the RGB color filters 131.

Using the same processes as in fabricating the LCD of the previous embodiment, formed over the overcoat layer 136 are: gate wiring including gate lines 22, gate electrodes 26, and storage wiring 28; gate insulating film 30; semiconductor layer 40; and data wiring including data lines 62, source electrodes 65, and drain electrodes 66. Then protective film 70 with contact holes 76 is formed on the structure.

A conductive layer is formed on the protective film 70, by sputtering for example, and is patterned to provide the pixel electrodes, including the microelectrodes 84 and the microslits 85 located between the microelectrodes 84. In particular, the cross-shaped main framework is formed which divides each pixel region into four sub-regions, and the microelectrodes 84 are formed to extend obliquely from the main framework toward the periphery of the corresponding pixel region. The oblique microelectrodes 84 extend in four directions from the cross-shaped main framework to form an angle of approximately 45 degrees with respect to a transmission axis of a polarizer which will be described later. The widths of the microelectrodes 84 and the microslits 85 and the maximum lengths of the microelectrodes 84 are as described above for the LCD according to the second embodiment of the present invention.

As in the previous embodiment, first vertical alignment film 92 is formed on the pixel electrodes. In this process, a sealant may be printed along edges of the first substrate 101.

Referring to FIG. 13, a second substrate 201 including an un-patterned common electrode 141 is placed opposite the first substrate 101. The second substrate 201 is formed as follows. A conductive layer, such as ITO, is deposited (e.g. sputtered) on insulating substrate 110 to provide common electrode 141. The common electrode 141 is not patterned in this embodiment, and therefore the processing time is reduced, and greater tolerance is obtained for misalignment between the first and second substrates 101 and 201 when the two substrates are assembled together. Accordingly, the defect rate can be reduced in the LCD manufacturing.

Next, second vertical alignment film 152 is printed on the common electrode 141. At the same time, a spacer can be provided as a coat on the common electrode 141 in order to maintain a desired cell gap between the first and second substrates 101 and 201.

The second substrate 201 fabricated as described above is placed opposite the first substrate 101. A sealant is deposited and hardened to bond the first and second substrates 101 and 201 together.

Figure 14:
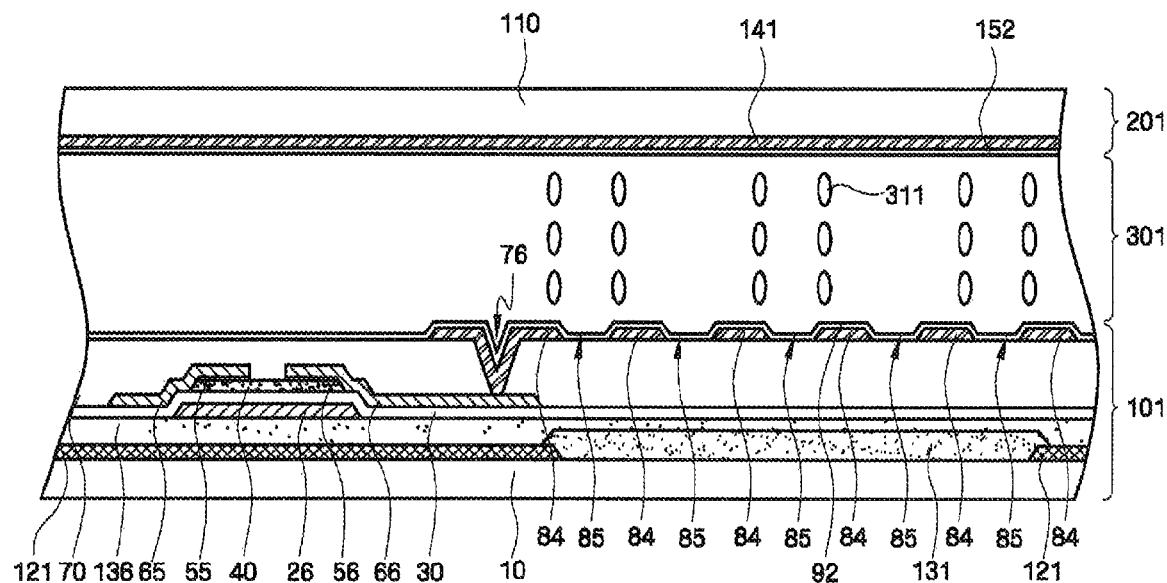

Referring to FIG. 14, a liquid crystal compound 301 is formed between the first and second substrates 101 and 201 from liquid crystal 311 and dopants controlling the pitch of the liquid crystal 311. The liquid crystal 311 and the dopants can be introduced between the first and second substrates by vacuum injection for example. The dopants can be chiral dopants. The dopants reduce the pitch of the liquid crystal 311 and thus improve the response time of the LCD. To provide high optical transmission in the LCD, the ratio of the cell gap to the pitch of the liquid crystal 311 may be 0.02 to 0.25.

Figure 15:
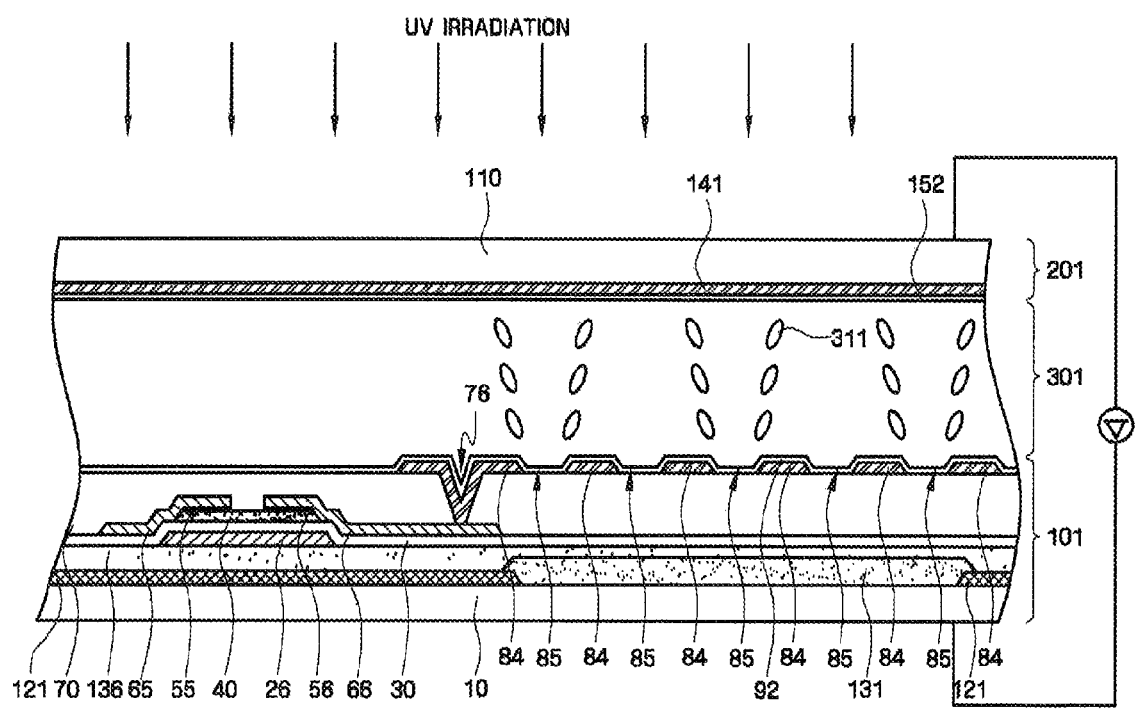

As in the previous embodiment, UV hardening monomers and UV hardening initiators can be added to the liquid crystal 311 and the dopants, and the resulting mixture can be irradiated by UV light to pre-tilt the liquid crystal molecules. See FIG. 15. The materials and the quantity ratios of the liquid crystal 311, the UV hardening monomers and the UV hardening initiators can the same as in the previous embodiment. FIG. 15 shows pre-tilt power applied to the first and second substrates 101 and 201 and UV light provided to the first and second substrates 101 and 201 to form the liquid crystal compound 301. The UV irradiation parameters, including the hardening voltage and the UV energy supplied to the LCD, can be as in the first embodiment of the present invention. This UV irradiation process may be performed immediately after the injection of the mixture containing the liquid crystal 311 between the first and second substrates 101 and 201.

As described above, when the pre-tilt power and the UV light are supplied to the LCD, the UV hardening monomers harden, causing the liquid crystal molecules 311 to pre-tilt. The intensity of the pre-tilt power is maintained constant and such that the liquid crystal molecules 311 are pre-tilted at an angle in the range of more than 88 degrees but less than 90 degrees with respect to the first substrate 101. Desirably, the pre-tilt angle may be in the range of more than 88.5 degrees but less than 90 degrees.

Since the liquid crystal molecules 311 are pre-tilted along the microslits 85 as described above in connection with FIG. 11, the random motion of the liquid crystals 311 is suppressed when power is applied to the LCD in normal operation. Accordingly, the LCD response time, measured as the time required for the image transition from black to white, is improved, and the formation of a reverse domain is prevented.

If the liquid crystal compound 301 is formed using the liquid crystal 311 and the dopants without the UV monomers and the UV hardening initiators, the UV irradiation process is not required.

Figure 16:
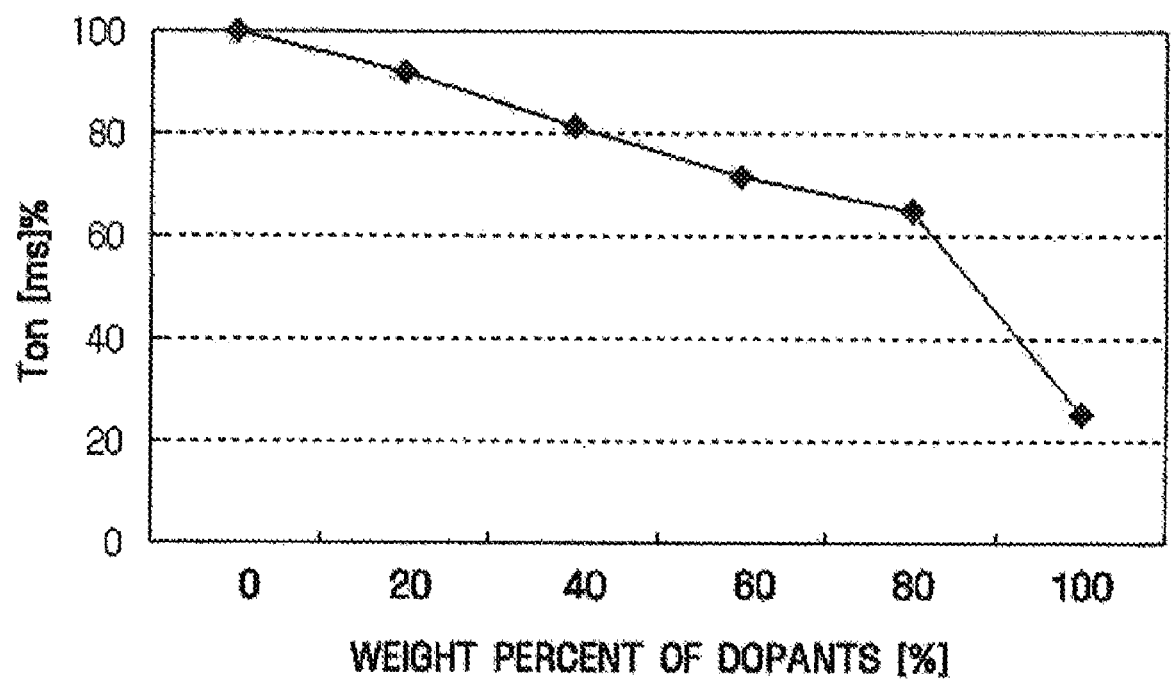
FIG. 16 is a graph illustrating the correlation between the liquid crystal pitch of an LCD according to the second embodiment of the present invention and the response time of the LCD.
Figure 17:
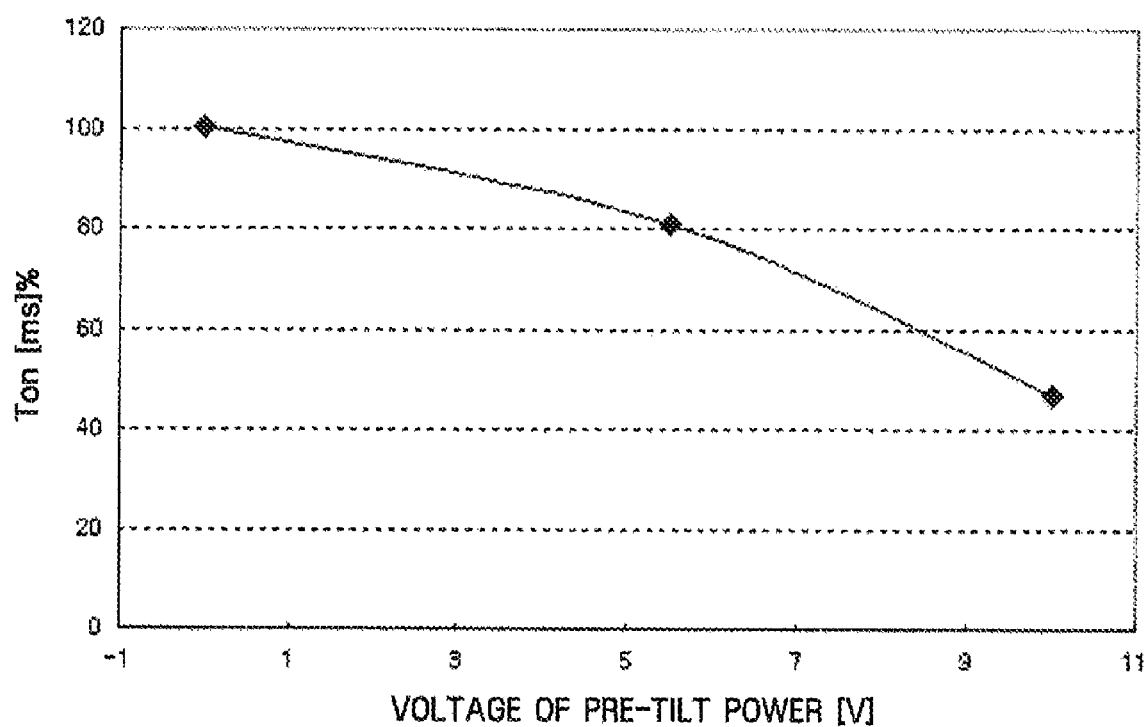
FIG. 17 is a graph illustrating the correlation between a UV hardening voltage used to fabricate an LCD according to the second embodiment of the present invention and the response time of the LCD.
Figure 18A:
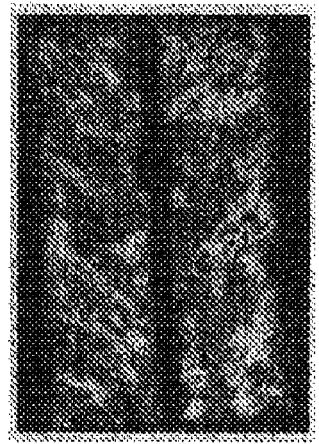
FIGS. 18A through 18C are photographs showing suppression of a reverse domain in an LCD according to the second embodiment of the present invention
Figure 18B:
Figure 18C:
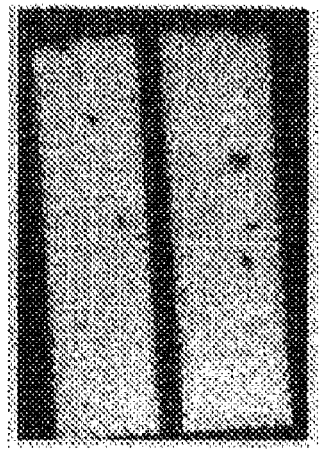

Improvements in the LCD response time fabricated according to the second embodiment of the present invention are illustrated in FIGS. 16 through 18. FIG. 16 is a graph illustrating the correlation between the weight percent of dopants of an LCD of the second embodiment and the LCD response time. FIG. 17 is a graph illustrating the correlation between the UV hardening voltage and the LCD response time for the second embodiment. FIGS. 18A through 18C are photographs showing that the reverse domain is suppress in such an LCD. Referring to FIG. 16, the LCD response time is taken as 100% when no dopants are added to the liquid crystal. As more dopants are added, the liquid crystal pitch decreases, and therefore the LCD response time decreases. In this way, proper amount of dopants can improve the LCD response time by more than 50%.

Referring to FIG. 17, the LCD response time is taken as 100% when the pre-tilt voltage is zero during the UV irradiation process. The LCD response time decreases as the pre-tilt voltage increases.

FIGS. 18A through 18C illustrate that if the pre-tilt voltage is 7 V and UV irradiation energy is 36 J (0.2 W/cm$^2$×3 minutes), the reverse domain is prevented. More particularly, FIGS. 18A through 18C show the LCD liquid crystal at consecutive moments of time when driving power is being applied. In FIG. 18C, the driving power has been on for 500 msec, and no reverse domain is present.

Referring to FIG. 15, a polarizer (not shown) may be provided on the rear surface of each of the first and second substrates 101 and 201 after the UV irradiation process. The first and second substrates 101 and 201 may be formed from the respective mother substrates.

Next, a backlight assembly with lamps is mounted under the first substrate 101, thereby completing the LCD fabrication.

As described above, some embodiments of LCDs and their fabrication methods provide at least one of the following advantages. The liquid crystal molecules can be pre-tilted at predetermined angles by UV radiation to improve the LCD response time and suppress a reverse domain. The response time can also be improved by suitable dopants are added to the liquid crystal molecules. Therefore, an LCD with improved response time can be.

Also, the response time can be improved without reducing the aperture ratio. Further, these advantages can be provided in a patternless VA mode LCD, with its high tolerance to misalignment during the assembly and high optical transmission as explained above.

The embodiments and advantages described above do not limit the invention. The invention is defined by the appended claims.

What is claimed is:

1. A liquid crystal display (LCD) comprising:
 a first substrate comprising a pixel electrode which comprises one or more first domain-forming features and further comprising a first vertical alignment film disposed on the pixel electrode;
 a second substrate facing the first substrate and comprising a common electrode which comprises one or more second domain-forming features and further comprises a second vertical alignment film disposed on the common electrode; and
 a liquid crystal compound interposed between the first and second substrates,
 wherein the liquid crystal compound is made from a mixture comprising liquid crystal molecules, ultraviolet (UV) hardening monomer molecules and UV hardening initiator molecules, and the liquid crystal molecules are pre-tilted to form an angle greater than 88 degrees but less than 90 degrees with respect to the first substrate when no driving voltage is applied to the pixel and common electrodes;
 wherein the liquid crystal compound is made from more than 0.025 wt % but less than 0.05 wt % of UV hardening initiator molecules based on the liquid crystal molecules.

2. The LCD of claim 1, wherein the first domain-forming features are first apertures formed in the pixel electrode and the second domain-forming features are second apertures formed in the common electrode.

3. The LCD of claim 2, wherein a lateral distance between the first and second apertures is 23 to 70 μm, the lateral distance being measured in a plane parallel to the first and second substrates.

4. The LCD of claim 1, wherein the liquid crystal compound is made from more than 0 wt % but less than 10 wt % of UV hardening monomer molecules based on the liquid crystal molecules.

5. The LCD of claim 4, wherein the liquid crystal compound is made from more than 0 wt % but less than 0.05 wt % of UV hardening monomer molecules based on the liquid crystal molecules.

6. An LCD comprising:
a first substrate comprising: a pixel electrode which comprises a plurality of microelectrodes and a plurality of microslits between the microelectrodes, and a first vertical alignment film on the pixel electrode;
a second substrate facing the first substrate and comprising an un-patterned common electrode and a second vertical alignment film on the common electrode; and
a liquid crystal compound between the first and second substrates,
wherein the liquid crystal compound is made from a mixture comprising liquid crystal molecules, UV hardening monomer molecules and UV hardening initiator molecules;
wherein the liquid crystal compound is made from more than 0.025 wt % but less than 0.05 wt % of UV hardening initiator molecules based on the liquid crystal molecules.

7. The LCD of claim 6, wherein the mixture further comprises one or more dopants controlling the pitch of the liquid crystal molecules.

8. The LCD of claim 7, wherein the dopants are chiral dopants.

9. The LCD of claim 7, wherein a ratio of a gap between the first and second substrates to the pitch of the liquid crystal molecules is in the range of 0.02 to 0.25.

10. The LCD of claim 6, wherein the liquid crystal molecules are pre-tilted at an angle of more than 88 degrees but less than 90 degrees with respect to the first substrate when no driving voltage is applied to pixel and common electrodes.

11. The LCD of claim 10, wherein the liquid crystal compound is made from more than 0 wt % but less than 10 wt % of UV hardening monomer molecules based on the liquid crystal molecules.

12. The LCD of claim 6, wherein each microelectrode becomes more narrow when traced from the center of the pixel electrode toward the periphery of the pixel electrode.

13. The LCD of claim 12, wherein the maximum length of the microelectrodes does not exceed $0.5^{1/2}$ times a horizontal length of the pixel electrode, the horizontal length being measured along a gate line of the LCD.

14. The LCD of claim 6, further comprising color filters formed on the first substrate, wherein the pixel electrode is disposed over the color filters.

15. A method of fabricating an LCD, the method comprising:
providing a first substrate which comprises: a pixel electrode having one or more first domain-forming features, and a first vertical alignment film disposed on the pixel electrode;
placing a second substrate to face the first substrate, wherein the second substrate comprises a common electrode having one or more second domain-forming features and also comprises a second vertical alignment film disposed on the common electrode;
providing a mixture of liquid crystal molecules, UV hardening monomer molecules and UV hardening initiator molecules between the first and second substrates; and
forming a liquid crystal compound made from the mixture comprising the liquid crystal molecules, the UV hardening monomer molecules and the UV hardening initiator molecules by applying voltage to pixel and common electrodes to pre-tilt the liquid crystal molecules and irradiating the first and second substrates with UV light;
wherein the liquid crystal compound is made from more than 0.025 wt % but less than 0.05 wt % of UV hardening initiator molecules based on the liquid crystal molecules.

16. The method of claim 15, wherein the liquid crystal compound is made from more than 0 wt % but less than 10 wt % of UV hardening monomer molecules based on the liquid crystal molecules.

17. The method of claim 16, wherein the liquid crystal compound is made from more than 0 wt % but less than 0.05 wt % of UV hardening monomer molecules based on the liquid crystal molecules.

18. The method of claim 15, wherein the liquid crystal compound further comprises a chiral dopant.

19. The method of claim 18, wherein the ratio of a gap between the first and second substrates to the pitch of the liquid crystal molecules is in the range of 0.02 to 0.25.

20. The method of claim 15, wherein the applied voltage is 2 to 10 V.

21. The method of claim 20, wherein the UV light supplies energy to the first and second substrates, the energy being 2 to 36 J per one $cm^2$ of pixel electrode area.

22. The method of claim 15, wherein the providing of the first substrate further comprises forming color filters on the first substrate, wherein the pixel electrode is disposed on the color filters.

* * * * *